United States Patent [19]

Tallon

[11] Patent Number: 5,193,380

[45] Date of Patent: * Mar. 16, 1993

[54] HIGH FLOW-RATE LEAK DETECTOR HAVING THREE MOLECULAR FILTERS

[75] Inventor: Jacques Tallon, Annecy, France

[73] Assignee: Alcatel CIT, Paris, France

[*] Notice: The portion of the term of this patent subsequent to Apr. 28, 2009 has been disclaimed.

[21] Appl. No.: 755,243

[22] Filed: Sep. 5, 1991

[30] Foreign Application Priority Data

Sep. 5, 1990 [FR] France ................ 90 11027

[51] Int. Cl.$^5$ ............................................. G01M 3/02
[52] U.S. Cl. ................................................. 73/40.7
[58] Field of Search ...................................... 73/40.7

[56] References Cited

U.S. PATENT DOCUMENTS

| | | |
|---|---|---|
| 3,591,827 | 7/1971 | Hall . |
| 3,592,048 | 7/1971 | Maurice et al. ............ 73/40.7 |
| 4,472,962 | 9/1984 | Mennenga ................. 73/40.7 |
| 4,499,752 | 2/1985 | Fruzzetti et al. ........... 73/40.7 |
| 4,583,394 | 4/1986 | Murakami et al. .......... 73/40.7 |
| 4,618,855 | 10/1986 | Harding et al. ............. 73/40.7 |
| 4,863,496 | 9/1989 | Ekiner et al. .............. 55/158 |
| 4,919,599 | 4/1990 | Reich et al. . |
| 5,010,761 | 4/1991 | Cohen et al. .............. 73/40.7 |
| 5,107,697 | 4/1992 | Tallon et al. .............. 73/40.7 |

FOREIGN PATENT DOCUMENTS 0283543 9/1988 European Pat. Off. .
0344345 12/1989 European Pat. Off. .
2190204 11/1987 United Kingdom .

Primary Examiner—Hezron E. Williams
Assistant Examiner—George M. Dombroske
Attorney, Agent, or Firm—Sughrue, Mion, Zinn, Macpeak & Seas

[57] ABSTRACT

A helium leak detector characterized in that it comprises a first molecular pump (T) having a high pumping speed, having its low-pressure outlet connected to an inlet (E) of the detector, and having its high-pressure outlet connected either to a pre-vacuum assembly (10) comprising a first valve (V1) and a first primary pump (P1), or to a measurement assembly (20) for measuring helium pressure and comprising:

- a first selective filter (F1) constituted by a molecular pump having a low pumping speed and a low compression ratio; and
- a second selective filter (F2) constituted by a molecular pump having a low pumping speed and a high compression ratio;

said first and second filters being connected to one end of a second valve (V2) having its other end connected between the turbomolecular pump and the first valve (V1), said detector further comprising a third selective filter (F3) in parallel with said second valve (V2), said third filter allowing helium to pass therethrough and preventing air or vapor from passing therethrough.

5 Claims, 5 Drawing Sheets

PRIOR ART

PRIOR ART

PRIOR ART

PRIOR ART

HIGH FLOW-RATE LEAK DETECTOR HAVING THREE MOLECULAR FILTERS

The present invention relates to a helium leak detector and to a method of implementing the apparatus.

Helium leak detectors for testing the gastightness of a part or of a tank are well known. It is recalled that the a helium leak detector is used to test the gastightness of a part as follows:

all except for one of the orifices of the part are closed off;

the orifice left free is connected to a helium detector;

the air is evacuated from the part;

the part is sprayed with helium which is used as a tracer gas; and any cracks are located by the appearance of helium detected by the detector, and the size of the crack is deduced by measuring the helium flow-rate.

In order to use the same apparatus for testing the gastightness of different-sized parts, e.g. ranging from an integrated circuit to a tank having a capacity of several hundred liters, the detector must meet a certain number of requirements concerning sensitivity, helium pumping speed, a phenomenon referred to as "helium memory", and pollution, in particular pollution by oil vapor.

These requirements are successively examined below.

a. Sensitivity

The detector must be capable of measuring low flow-rates of about $10^{-11}$ mbar.l/s and to measure them in the presence of high flow-rates of nitrogen, of water vapor and of oil vapor that may be as much as $10^{-1}$ mbar.l/s. This requires in particular the detector to be capable of quickly reducing the helium partial pressure in the part to be tested (which partial pressure is due to the helium contained in air) to a lower value than the value given by the minimum desired flow-rate indicated above. The detector must also be capable of measuring a helium flow-rate due to a large leak, e.g. about 100 mbar.l/s.

b. Helium pumping speed

In order to supply an electric signal quickly (i.e. in a few seconds) when testing the gastightness of a part having a volume of 200 liters, for example, the detector must have a high pumping speed at its inlet coupling both for air and for helium, e.g. about 20 liters/s.

c. Helium memory

A detector that has just measured a large leak and has therefore measured a high helium flow-rate may retain helium molecules in its component parts (pumps, piping, etc.), and such helium molecules distort any subsequent measurement corresponding to a lower helium flow-rate. This phenomenon may be referred to as "helium memory". A high-sensitivity detector must be protected against such phenomena.

d. Pollution by oil vapor

For a long time, liquid nitrogen traps were used to avoid such pollution. This technique has been abandoned because it entails constraints that are too great for industrial applications. It is nevertheless necessary to protect the detector and the parts to be tested from oil vapor of internal origin (vane pumps) or of external origin.

An object of the present invention is to implement a detector which resolves the above-mentioned technical problems. This is not achieved by any of the prior art detectors.

A first prior art detector is shown diagrammatically in FIG. 1.

The letter E designates the detector inlet to which the part to be tested is connected. The detector includes a first vane pump P1 connected to the inlet E via a first valve V1, and a diffusion pump D1 connected to the inlet E via a liquid nitrogen trap PA and via a second valve V2. A second vane pump P2 serves as a primary pump for the pump D1. A spectrometer C is connected to the liquid nitrogen trap PA. Such a detector provides high sensitivity when valve V1 is closed and valve V2 is open, but this requires low helium pumping speed in the region of cell C, and therefore low helium pumping speed at the inlet coupling E. Under these conditions, the maximum absorbable air flow-rate in the region of the spectrometer is limited to about $10^{-3}$ mbar.l/s.

FIG. 2 shows a variant embodiment of the FIG. 1 diagram. In FIG. 2, the liquid nitrogen trap PA has been removed and the spectrometer has been connected to the diffusion pump D1. The detector suffers from the same drawbacks as the FIG. 1 detector, which drawbacks are made worse by the fact that the opening of the valve V2, and therefore the pumping speed at E, is limited by the degassing of water vapor coming from the part to be tested. This limitation does not exist in the FIG. 1 detector because of the presence of the liquid nitrogen trap.

FIG. 3 shows a detector which uses a technique known as the "countercurrent" technique. The detector comprises a vane pump P1 connected to the inlet coupling E via a valve V1, and a molecular pump T1 connected via a valve V2 to the duct interconnecting pump P1 and valve V1. The spectrometer is connected to the low-pressure portion of the molecular pump. The helium reaches the cell against the flow passing through the molecular pump T1, hence the name given to this technique. The sensitivity of such an apparatus may be about $10^{-11}$ mbar.l/s, for example, subject to reducing the helium pumping speed at the suction of pump P1, and therefore at the inlet.

FIG. 4 shows another variant of a prior art detector, described in particular in the brochure ALCATEL ASM 151 T2. It comprises two molecular pumps T1 and T2 which are connected via respective valves V2 and V1 to the inlet coupling E of the detector, and which are equipped with respective primary vane pumps P1 and P2. The spectrometer C is connected between valve V2 and molecular pump T1. This layout provides both high sensitivity when V1 is closed and V2 is open, and also high air pumping speed in the pre-vacuum period by means of T2, but, in other cases, this layout does not enable both high pumping speed at E and high sensitivity to be obtained by T1.

It may be seen that these prior art apparatuses cannot reconcile the two apparently contradictory requirements of high sensitivity and high pumping speed. This is because the same pump (D1, T1 in FIGS. 1, 2 and 4, and P1 in FIG. 3) must have both high pumping speed so as to achieve high pumping speed at E, and also low pumping speed so as to achieve high sensitivity. These requirements are clearly contradictory.

An object of the present invention is to implement a helium detector for universal use, i.e. which is suitable both for use in testing any industrial part of up to a few hundred liters, and also for measuring very small helium leaks in the presence of high vapor flow-rates. The detector must further have high pumping speeds both for air and for helium, little "helium memory", and be well protected against pollution in spite of the absence of a nitrogen trap.

These objects are achieved by a helium leak detector of the invention which is characterized in that it comprises a first molecular pump having a high pumping speed, having its low-pressure outlet connected to an inlet of the detector, and having its high-pressure outlet connected either to a pre-vacuum assembly comprising a first valve and a first primary pump, or to a measurement assembly for measuring helium pressure and comprising:

a first selective filter constituted by a molecular pump having a low pumping speed and a low compression ratio; and a second selective filter constituted by a molecular pump having a low pumping speed and a high compression ratio;

said first and second filters being connected to one end of a second valve having its other end connected between the turbomolecular pump and the first valve, said detector further comprising a third selective filter in parallel with said second valve, said third filter allowing helium to pass therethrough and preventing air or vapor from passing therethrough.

Preferably, the first molecular pump having a high pumping speed is a turbomolecular pump or a Holweck pump; the first selective filter is a turbomolecular pump or a Holweck pump; and the second molecular filter is a turbomolecular pump or a Holweck pump.

Advantageously, said third filter is a membrane, e.g. made of polyamide.

The invention will be well understood from the following description of an embodiment of the invention given with reference to the accompanying drawings, in which.

FIGS. 1 to 4 have already been commented on and no further reference is made to them.

Figure 1:
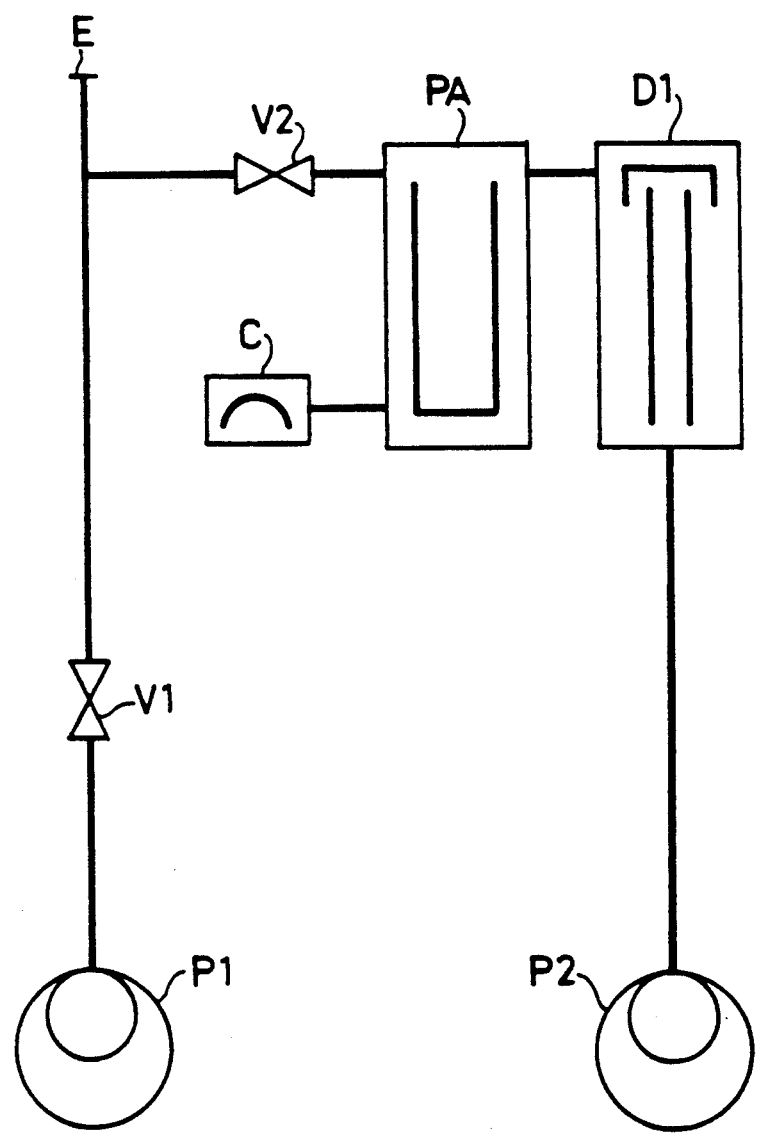
FIGS. 1 to 4 are diagrams of prior art helium detectors.
Figure 2:
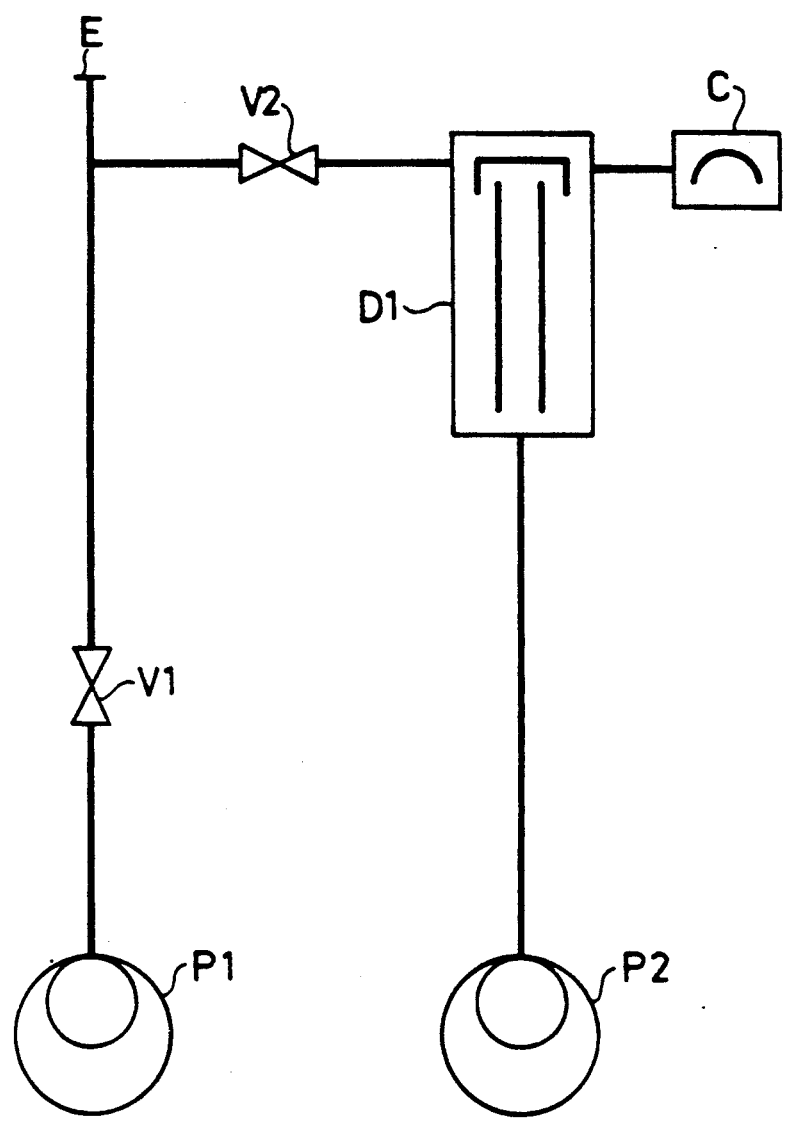
Figure 3:
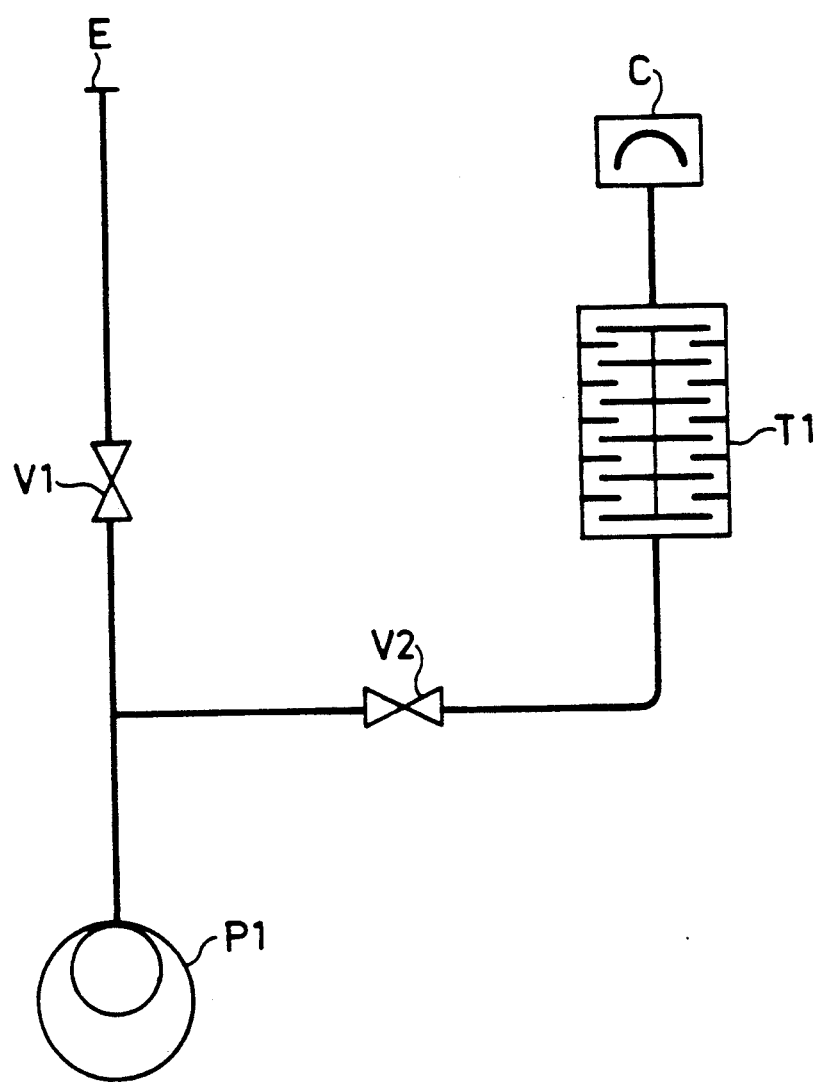
Figure 4:
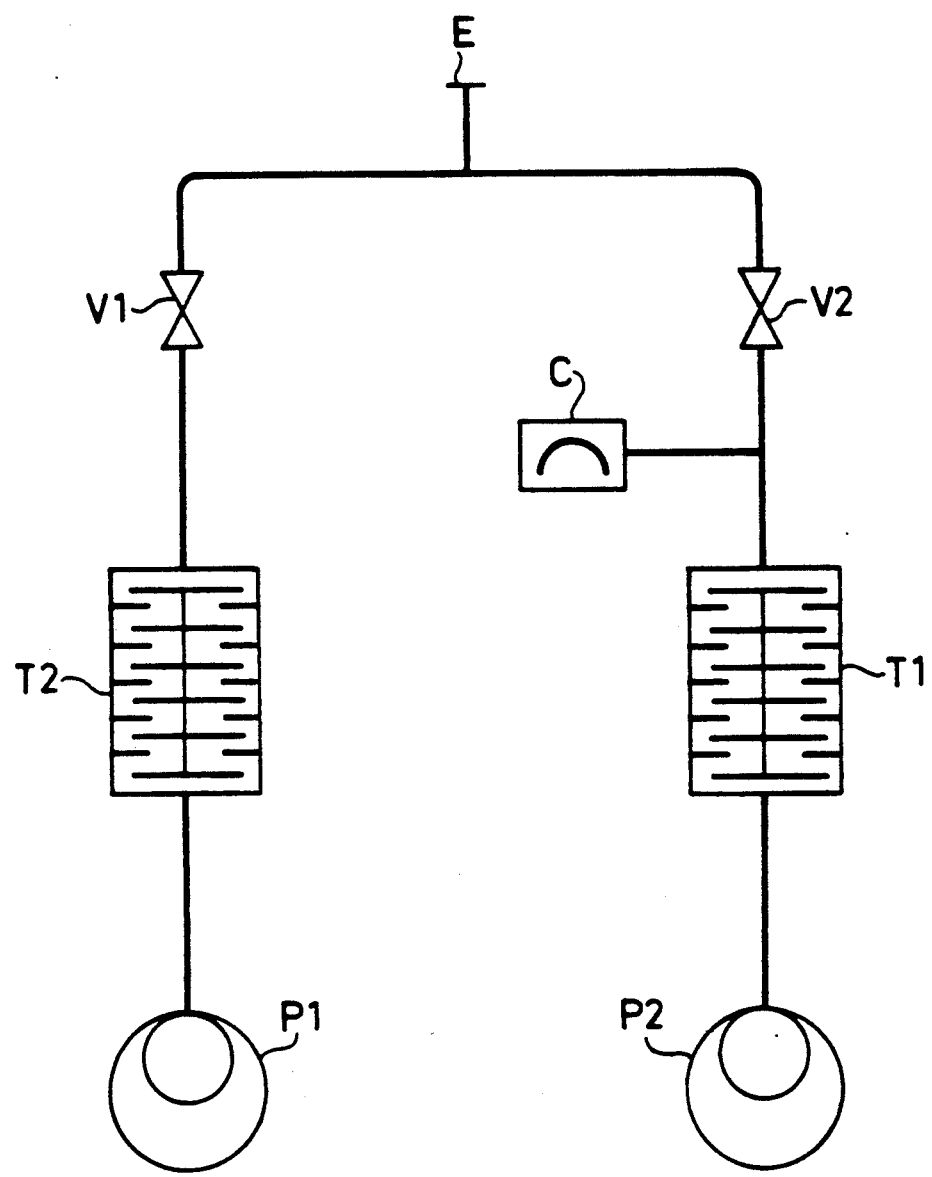
Figure 5:
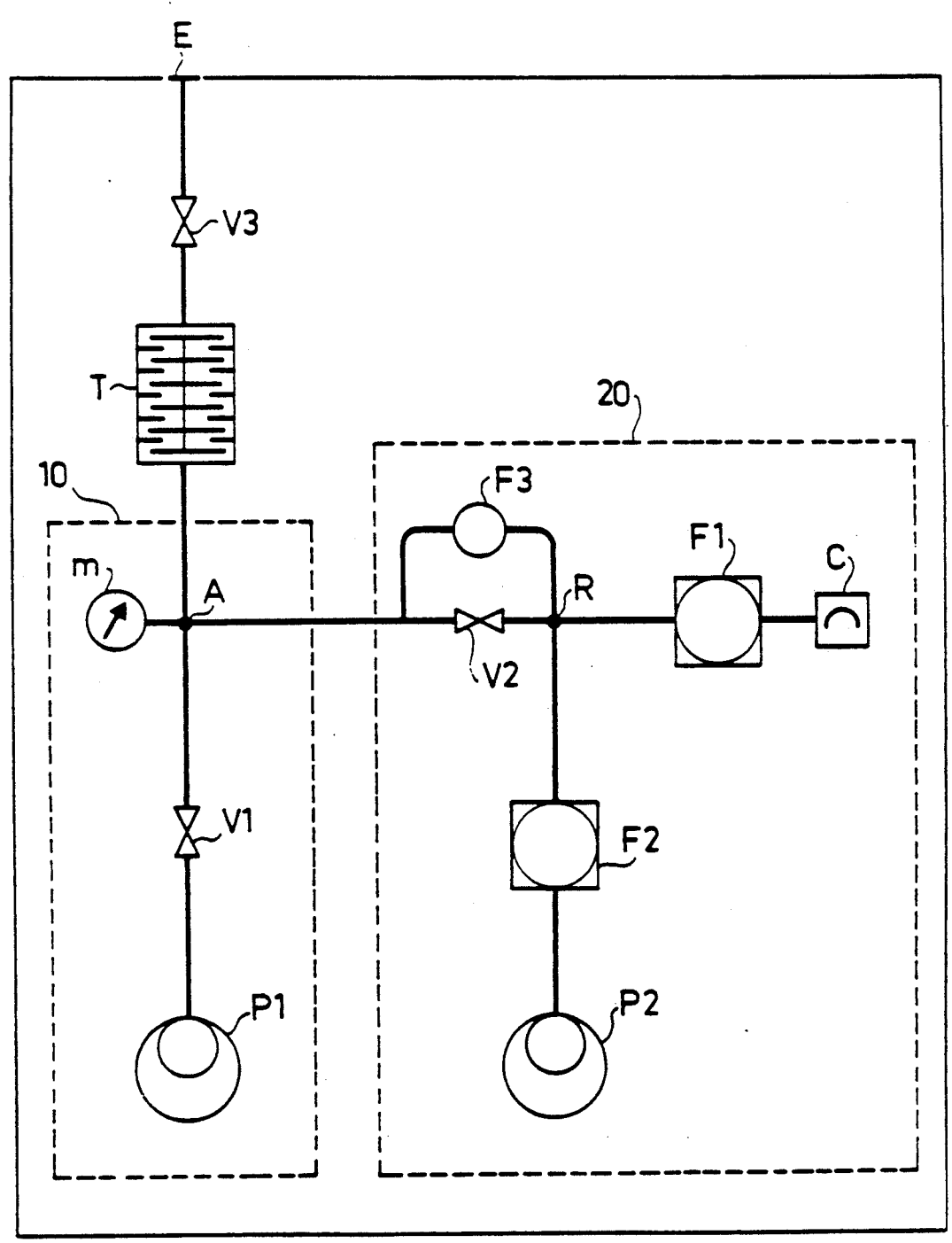
FIG. 5 is a diagram of a detector of the present invention.

For components performing the same functions, the same references have been used in FIG. 5 as in FIGS. 1 to 4. The letter E designates the inlet coupling of the leak detector. A detector of the invention is shown within a solid-line rectangle. The detector includes a pre-vacuum assembly within dashed-line rectangle 10, and a measurement assembly within dashed-line rectangle 20. The inlet of the detector is connected to a first molecular pump T via a valve V3. The pump has two functions.

1. Function in pre-vacuum operation

The first step in testing gastightness by helium is to evacuate the air from the part to be tested, which first step is usually performed by a vane pump. In the invention, the air is evacuated by the molecular pump T which may be a turbo-molecular pump or a Holweck pump. The air evacuated by pump T via valve V3 is delivered via the pre-vacuum assembly 10 which comprises a valve V1, a primary pump P1 which may be a vane pump, and a pressure gauge m.

Pump T must have high pumping speed so that the air in the part to be tested is evacuated quickly (requirement of point b above).

Pump T must have a low limit pressure ($10^{-5}$ mbar) for air and therefore for the helium contained in the air (requirement of point a above).

Lastly, pump T must have a high compression ratio so as to prevent the oil vapor from pump P1 polluting the part to be tested (requirement of point d above).

2. Function in measurement operation

At the end of the pre-vacuum step, the pressure in the part to be tested has been greatly reduced by pump T (to less than a thousandth of one millibar). Valve V1 is closed. The second step of testing may be started. Pump T is put into communication with the measurement assembly 20 by opening a valve V2 having one end connected to a point A situated between pump T and valve V1, and another end R connected to the respective inlets of two selective filters F1 and F2.

Filter F2 is a molecular pump which is pumped by a primary pump P2.

Filter F1 is a countercurrent molecular pump and which is connected to a spectrometer cell C.

A third selective filter F3, the nature of which is explained below, is disposed in parallel around valve V2.

When valve V2 is opened, the helium delivered by pump T at high pumping speed passes through F2 (a molecular pump acting as a filter) and is then sucked into primary pump P2 which may be a vane pump.

The pumping capacity of pump F2 is of little importance: its pumping speed may be equivalent to the pumping speed of P2 (about a few liters/s); but the compression ratio K2 of pump F2 must be high for helium (e.g. about 1,000) and therefore also for other gases or vapors. In this way, when a high flow-rate of helium (e.g. 0.1 mbar.l/s) is sucked in by pump T and ends up in pump P2, and reverse diffusion of helium from pump P2 (accumulated in the pump) back to the cell C is low because of the high compression ratio of pump F2 (the requirement of point c above). In addition, due to the high value of the ratio K2, pump P2 also acts as a filter for oil vapor from pump P2 by preventing such vapor from going back up to point R and from there on to the cell C (the requirement of point d above).

Filter F2 may be implemented by any pumping system that has high helium compression ratio and that is not a source of pollution. Any mechanical molecular pump may be considered, and in particular a Holweck pump. Use of an oil vapor diffusion pump should be avoided since although its helium compression ratio is high enough, it would lead to pollution phenomena. The quantity of helium flowing from E to pump P2 is measured by measuring the helium partial pressure at R by the pressure gauge constituted by the assembly comprising filter F1 (a countercurrent molecular pump) and the spectrometer C.

As is the case for pump F2, the pumping capacity of pump F1 is of little importance (a few liters/s suffice), but unlike pump F2, the helium compression ratio K1 of pump F1 must be low (e.g. about 50) so that the helium pressure at R is not reduced too much at C by the compression ratio K1 (the requirement of point a above).

This is because of the following relationship:

(pressure at $C$) = (pressure at $R$)/$K1$

Pump F1 may be of the same kind as pump F2 as long as its helium compression ratio is low. A Holweck-type pump or a turbomolecular-type mechanical pump is well suited. An oil vapor diffusion pump should be avoided since although it is otherwise suitable, it would add pollution phenomena.

The design of a detector of the invention solves the problems raised by points a to d laid out above. The conventional contradiction that exists between high pumping speed at the inlet and high sensitivity is overcome because these requirements are dealt with separately.

High pumping speed at the inlet is obtained by pump T having a high pumping speed.

High sensitivity is obtained by pump F2 having a low pumping speed and pump F1 having a low compression ratio.

High sensitivity is also provided by the option of reducing the air and helium pressures at the inlet E quickly by means of pump T having a high pumping speed which is no longer limited by sensitivity considerations.

Designed in this way, a detector of the invention may detect helium flow-rates covering 10 decades:

from $10^{-11}$ mbar.l/s to 0.1 mbar.l/s.

In order to increase the dynamic range of the apparatus further so as to reach 15 measurement decades, a pressure gauge m placed at A at the outlet from pump T prevents valve V2 from being opened if the pressure at A does not drop below 0.1 mbar. Valve V1 then stays open and the helium pressure at A is measured by means of a third filter F3 disposed in parallel over valve V2. Filter F3 must be suitable for enabling a helium partial pressure of $10^{-3}$ mbar to be measured while, at the same time, the total air pressure is 1,000 mbars. In other words, filter F3 must allow helium to pass therethrough while preventing air or vapor from passing therethrough.

Filter F3 may be implemented simply by a polyamide membrane.

I claim:

1. A helium leak detector comprising a first molecular pump (T) having a high pumping speed, having an low-pressure outlet connected to an inlet (E) of the detector, and having a high-pressure outlet connected either to a pre-vacuum assembly (10) comprising a first valve (V1) and a first primary pump (P1), or to a measurement assembly (20) for measuring helium pressure and comprising:

a first selective filter (F1) constituted by a molecular pump having a low pumping speed and a low compression ratio;

a second selective filter (F2) constituted by a molecular pump having a low pumping speed and a high compression ratio;

said first and second filters being connected to one end of a second valve (V2) having an other end connected between the molecular pump and the first valve (V1), and a third selective filter (F3) in parallel with said second valve (V2), said third filter allowing helium to pass therethrough and preventing air or vapor from passing therethrough.

2. A detector according to claim 1, wherein the first molecular pump (T) having a high pumping speed is a turbomolecular pump or a Holweck pump.

3. A detector according to claim 1, wherein the first selective filter (F1) is a turbomolecular pump or a Holweck pump.

4. A detector according to claim 1, wherein the second molecular filter (F2) is a turbomolecular pump or a Holweck pump.

5. A detector according to claim 1, wherein said third filter (F3) is a polyamide membrane.

* * * * *